Patented Jan. 5, 1943

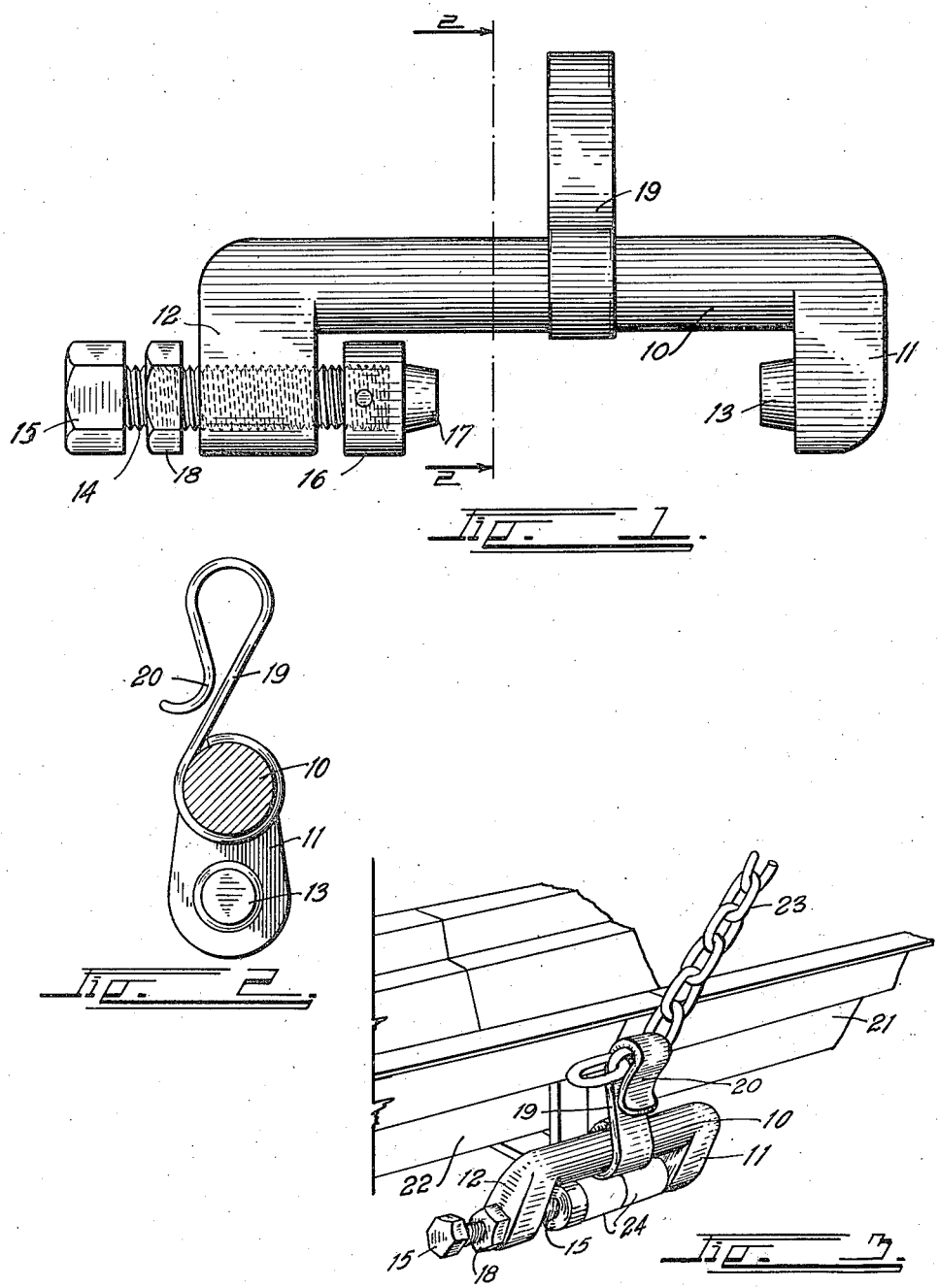

2,307,414

UNITED STATES PATENT OFFICE 2,307,414

PAN LINE CONNECTOR

John A. MacPherson and Edward Lasnik,
Erie, Colo.

Application December 29, 1941, Serial No. 424,772

1 Claim. (Cl. 198—220)

This invention relates to a connector for the pans in the pan lines of shaker conveyors.

The usual pan line consists of a series of metal troughs which interlock against each other and which are ordinarily secured together by means of large bolts passing through adjacent sleeves formed on the extremities of the pans in the pan lines. These bolts become weakened by the vibration of the pans and by the bending action at the pan joints so that they break and fall from place. They require much time for removal and replacement when the pans are removed or added since their nuts must be entirely separated from the bolts and the entire bolt must be withdrawn or driven from place. The threads also become damaged in the pan sleeves so that it is soon impossible to replace the nuts and the latter together with the bolts become lost in the coal.

The principal object of this invention is to provide an economical, highly efficient device for replacing the present pan line bolts which will eliminate all of the above enumerated objections to the bolts.

The improved pan line connector is not affected by bending or vibration of the joint. It can be completely removed or attached by very few simple turns of a clamp screw and it has no loose parts to become lost in the coal and the threads are protected from injury.

Another object of the invention is to incorporate with the improved pan line connector means by which it can be instantly attached to or detached from the pan line suspension chains at any desired point on the latter.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side view of the improved pan line connector;

Fig. 2 is a cross section therethrough, taken on the line 2—2, Fig. 1; and

Fig. 3 is a fragmentary, perspective view illustrating the invention as it would appear in use.

The improved pan line connector comprises a shank portion 10 having a head member 11 and a foot member 12 projecting from the opposite extremities thereof in a common plane. The shank, with its head and foot members, is formed as an integral piece such as a steel casting, drop forging, or the like.

The foot member 12 is provided with a tapered boss 13. The head member 11 is drilled in axial alignment with the boss 13 to receive a clamp screw 14. The clamp screw terminates at one extremity in a typical hexagonal bolt head 15 and at its other extremity in a circular block 16 provided with a concentric tapered boss 17.

The screw 14 carries a lock nut 18 intermediate the head 15 and the foot member 12. Either the head 15 or the block 16 may be formed as an integral part of the screw 14 and the other permanently secured in place thereon after the screw is in place in the foot member 12. As illustrated, the head is a part of the screw and the block 16 is secured thereon by means of a set pin 25.

In Fig. 3, the extremities of two typical pans are indicated at 21 and 22 provided with the usual cross braces which are rolled back upon themselves to form bolt sleeves 24. The invention is applied to the bolt sleeves by unscrewing the screw 14 sufficiently to allow the two bosses to be inserted in the outer ends of the adjacent bolt sleeves 24. The screw is then tightened to force the two bolt sleeves firmly together between the head member 11 and the block 16. The lock nut 18 may be then tightened to lock the screw 14 in its tightened position.

It will be noted that since no part of the device passes through the sleeves, it cannot be affected by any bending or shifting action therein and the screw threads cannot be damaged by the sleeves. It will also be noted that to remove the device it is only necessary to back the block 16 away only sufficiently far to release one of the bosses 13 or 16 from its sleeve. The latter boss can then be swung to one side to instantly release the other boss. This requires only about three revolutions of the screw 14.

The bosses only serve to position and hold the connector in place until the screw is tightened. They need serve no function in keeping the pans in alignment since this is accomplished by the standard overlapping, interlocking action of the extremities of the pans themselves.

The shank 10 is provided with a hook 19, one extremity of which extends around and is secured to the shank in any desired manner such as by welding. The other extremity of the hook is turned backwardly and outwardly on itself to form a resilient throat portion 20 which can be snapped over any desired link of a supporting chain, such as illustrated at 23 in Fig. 3, to support the pan at the desired height. The hook 19 is preferably formed of spring steel so that the throat portion will resiliently snap closed after the chain is inserted.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A connector for shaker conveyor pans comprising: a shank; a head member projecting to one side of said shank at one extremity thereof; a foot member projecting from the same side of said shank at the other extremity thereof; a boss on said head member projecting toward said foot member; a screw through said foot member in axial alignment with said boss; and a hook member wrapped about the mid-portion of the shank and projecting from the side opposite said head and foot members for engaging a supporting chain.

JOHN A. MacPHERSON.
EDWARD LASNIK.